May 19, 1931.  F. ANGELILLO  1,805,508

VEHICLE JACK

Filed Nov. 17, 1930

INVENTOR
Fedele Angelillo
BY Percy Freeman
ATTORNEY

Patented May 19, 1931

1,805,508

UNITED STATES PATENT OFFICE

FEDELE ANGELILLO, OF NEW YORK, N. Y.

VEHICLE JACK

Application filed November 17, 1930. Serial No. 496,111.

This invention relates to that class of apparatus known as vehicle jacks by means of which any of the wheels may be raised from the ground surface.

Such operations as changing the tires, making temporary repairs and the like can only be accomplished by relieving the wheel from the weight of the car and raising it off the ground while working on it.

The ordinary types of lifting jacks are notoriously inconvenient and hard to operate, requiring very considerable muscular effort and experience to handle in an effective manner.

It is therefore an object of the present invention to provide an efficient device whereby any of the wheels may be raised to a suitable height with substantially no effort on part of an operator, preliminary to making desired changes.

A further feature is in the provision of a raising device adapted to engage cars provided with wheels of different dimensions with equal facility.

Another aim is to produce a raising device of extreme simplicity, strength, and lightness of weight, well adapted to be carried as part of the equipment of the car.

These several advantageous objects are accomplished by the novel design, construction and combination of few simple parts as hereinafter described and illustrated in the accompanying drawings constituting an essential portion of this disclosure, and in which.

Referring to the figures in greater detail the numeral 10 designates a chassis frame side member supported by a semi-elliptical spring 11 carried by an axle having wheels, at 12, at its ends, these wheels being provided with the usual type of inflatable tires 13.

Figure 1:
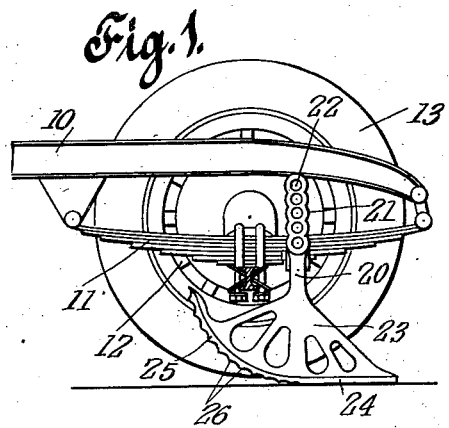
Fig. 1 is a fragmentary side elevational view of the frame, spring and wheel of a conventional type of car, illustrating the application of one form of the invention.
Figure 2:
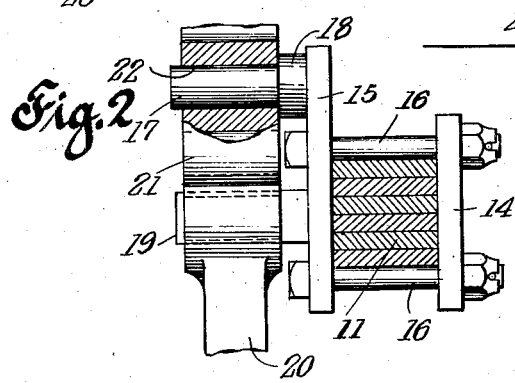
Fig. 2 is an enlarged transverse sectional view of the same.
Figure 3:
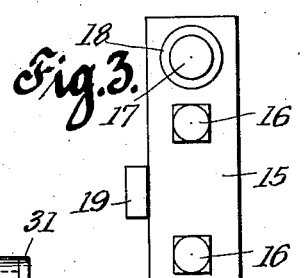
Fig. 3 is a side view thereof.

As seen in Figs. 1 and 2, the leaves of the spring 11 are clamped at a point adjacently the front of the axle by a yoke having an inner strap bar 14 and an outer, longer bar 15, at the front, held firmly by clamp bolts 16.

Set rigidly in the extending portion of the clamp bar 15 is a stud 17 having a spacing shoulder 18, and fixed rigidly to one of the longer edges of the bar 15, at a point midway the bolts 16, is a bar 19 of rectangular cross section extending in parallel with the stud 17, these elements being permanently applied to each spring.

The jack proper is composed of a stem 20 leading to an elongated and enlarged head 21 in which are a series of spaced openings 22 each adapted to receive the stud 17 while the bar 19 makes contact with the surface of the head.

The opposite end of the stem 20 blends into a fan shaped web 23, which may be provided with openings to reduce unnecessary weight, the web having a flange at its periphery, one part 24 being straight, flat and at a right angle to the stem, while on the opposite end the flange is arcuately curved as at 25, and provided with sharp serration 26 adapted to engage and grip a surface.

The extremity of the curved flange is closer to the head 21 than at the point blending into the level portion 24 and obviously will be so placed on the ground surface as to raise the wheel and corner of the car as the vehicle is advanced to cause the stem 20 to assume a perpendicular position.

Figure 4:
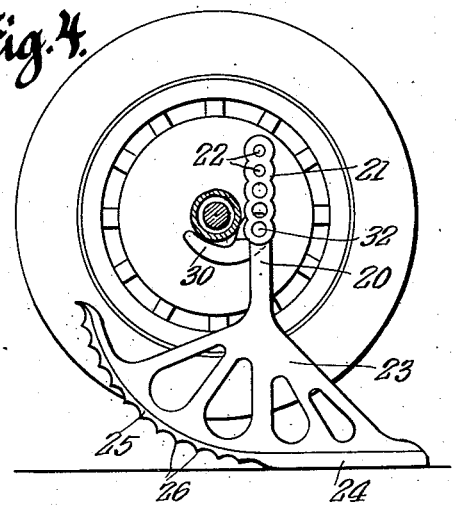
Fig. 4 is a side elevational view of a car wheel and axle showing a modified means for attaching the jack.
Figure 5:
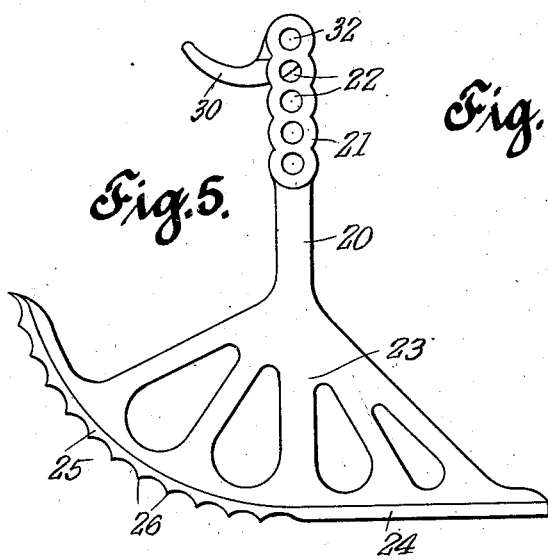
Fig. 5 is a side view of the jack in detail.
Figure 6:
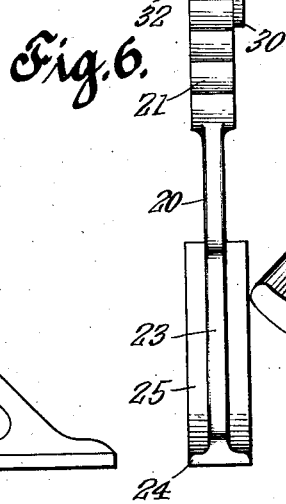
Fig. 6 is a front view of the same.
Figure 7:
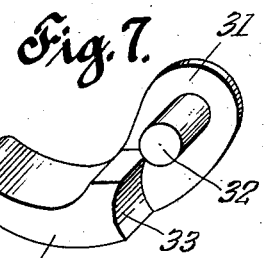
Fig. 7 is a perspective view of the lifting hook in detail.

In the modification, shown in Figs. 4, 5 and 6, the permanent jack attachments 14 to 19 inclusive are dispensed with but the main jack structure is employed.

In this case a curved hook 30 of considerable width, is provided with an extending lug 31 in which is set a rigid pin 32 engageable in any of the openings 19 of the head, while a shouldered portion 33 of the concave hook 30 engages the side of the head 21.

In operation the hook is disposed to engage the underside of the axle or that portion of the transmission casing surrounding it, as seen in Fig. 4, and the car propelled a short distance forwardly whereupon the same raising effect is produced.

Due to the series of openings 22, the pins 17 or 32 may be entered at different heights relative to the base flange 24, thereby enabling the jack to be used even when different diameters of wheels are encountered and also to raise the wheels to a reasonable height from the ground surface.

Obviously, upon moving the car rearwardly the jack is released, permitting removal and storage within the car if desired.

While certain preferred embodiments of this device have been shown and described, it will be understood that changes in the form, arrangements, proportions, sizes and details thereof may be made without departing from the scope of the invention as defined in the appended claims.

Having thus described my invention, what I claim as new and desire to secure by Letters Patent, is:

1. In a jack for wheeled vehicles having an axle between each pair of wheels, a base member having an arcuately curved portion provided with teeth to engage a surface, a web having a stem integral with said base, an elongated head on said stem having a row of spaced perforations, a hook having a pin engageable selectively in any of the head perforations, said hook adapted to partially encircle the lower side of said axle, and an abutment on said hook to engage the side of said head and stem.

2. A wheel raising jack comprising a ground engaging base member, a stem extending upwardly therefrom and formed with a series of vertically spaced openings in the upper end portion thereof, a hook for engagement with a part of the vehicle, a longitudinally extending lug formed on the inner end portion of the hook at one side thereof, and a laterally extending pin carried by the lug for selective engagement in the holes formed in said stem, the inner end of the hook adapted to engage the side of the stem to limit the swinging movement of the hook in one direction.

Signed at New York, in the county and State of New York this 12th day of November, 1930.

FEDELE ANGELILLO.